United States Patent [19]

Klein et al.

[11] 4,309,115

[45] Jan. 5, 1982

[54] METHOD AND APPARATUS FOR IMPROVED SOLIDS CONVEYING IN PLASTICATING EXTRUDERS

[76] Inventors: Imrich Klein, 70 S. Adelaide Ave., Highland Park, N.J. 08904; Reuben Klein, 103 Jeremy Ct., Edison, N.J. 08817

[21] Appl. No.: 149,675

[22] Filed: May 14, 1980

[51] Int. Cl.³ .............................................. B29B 1/06
[52] U.S. Cl. ........................................ 366/79; 366/89
[58] Field of Search .................. 366/89, 79, 80, 81, 366/82, 83, 84, 85, 86, 87, 88, 90, 98, 99; 264/338; 425/376, 207, 208

[56] References Cited

U.S. PATENT DOCUMENTS 4,049,245  9/1977  Tadmor .................................. 366/89
4,053,143  10/1977  Hosokawa ............................. 366/89

OTHER PUBLICATIONS

Journal of Teflon (Dupont); vol. 4, #7, 1963.

*Primary Examiner*—Robert W. Jenkins
*Attorney, Agent, or Firm*—Samuelson & Jacob

[57] ABSTRACT

Method and apparatus in which a selected coating is applied to specific surfaces within a plasticating extruder to change the coefficient of friction between the solids being conveyed in the extruder and the specific surfaces in such a way as to improve solids conveying and thereby increase the production effectiveness of the extruder.

12 Claims, 1 Drawing Figure

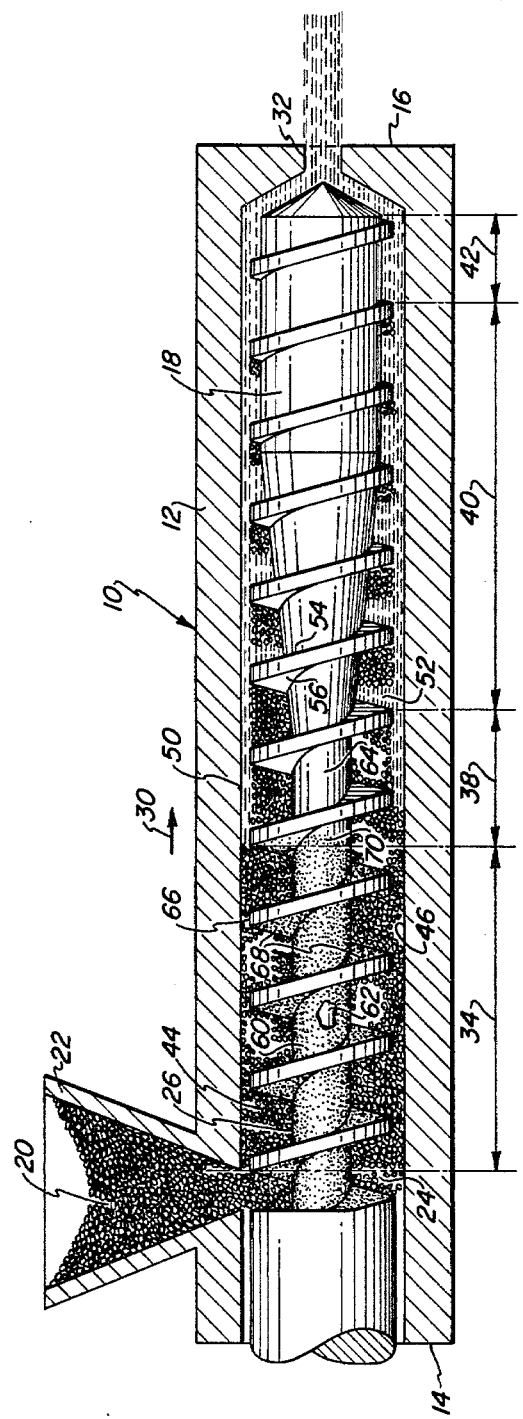

METHOD AND APPARATUS FOR IMPROVED SOLIDS CONVEYING IN PLASTICATING EXTRUDERS

The present invention relates generally to plasticating extruders and pertains, more specifically, to increasing the production effectiveness of plasticating extruders through improved solids conveying within such extruders.

It is well-known that the output performance of a plasticating extruder or molding machine depends, to a very large extent, upon the geometric construction of the screw conveyor of the extruder. For a given screw conveyor geometry, output performance is directly related to a variety of operating conditions, some of which are the temperature of the screw conveyor, the temperature of the barrel of the extruder, and the speed of rotation of the screw conveyor. The production rate of an extruder can be increased, with improved quality in the extrudate, by providing the appropriate screw conveyor design for a particular operation and then employing optimum operating conditions.

An important aspect which should be considered in attaining an optimum rate of production from an extruder, with a high quality extrudate, is the effectiveness of solids conveying in the solids conveying zone of the extruder. The solids conveying zone of an extruder usually is short in comparison to the length of the extruder. It begins at the downstream end of the hopper opening and ends further downstream at an axial location where a thin film of melt starts to form along the inner surface of the barrel.

The pressure rise along the solids conveying zone normally is a few pounds per square inch (psi). Such a low pressure is very difficult to measure in an extruder. For that reason, solids conveying generally has been disregarded as a factor in extruder performance. Nevertheless, it is an important factor because the solids conveying zone has a significant effect on the overall performance of the extruder. The pressure within the solids conveying zone must rise sufficiently to compact the solid bed; otherwise, a loosely packed solid bed will include large voids, which will interfere with the formation of the melt film along the barrel surface. Since all melting activity in an extruder takes place within the melt film, discontinuities in the melt film at any point along the extruder channel will tend to lower the output of the extruder. In addition, such voids can show up in the extrudate, thereby degrading the quality of the finished product.

It has been demonstrated that the frictional properties of a synthetic resin have a direct and important effect on how efficiently the material will be moved through the solids conveying zone of an extruder and, hence, will affect the output rate, melting performance of the extruder, and even the amount of air bubbles present in the extruded product. Maintaining an adequate differential between the coefficients of friction at the screw conveyor outer surface and at the barrel inner surface of the solids conveying zone has been found to be a key factor in attaining efficient solids conveying. It also is known that the coefficient of friction varies with pressure, as well as with the velocity and temperature of these surfaces and that controlling the temperature of the screw conveyor and the barrel in the solids conveying zone is one way in which to adjust the coefficient of friction differential so as to attain effective solids conveying.

In our copending patent application, entitled "Apparatus and Method for Attaining Maximum Production Effectiveness in a Plasticating Extruder," Ser. No. 120,390, filed Feb. 11, 1980, we described method and apparatus by which the temperature of the barrel inner surface and the temperature of the screw conveyor outer surface of a plasticating extruder are varied to attain the known advantages of an optimum differential in the coefficients of friction for effective solids conveying.

In the present invention, we make use of the fact that the coefficient of friction between contacting surfaces generally is a function of the materials which contact one another at these surfaces. By selecting appropriate materials, various combinations of materials can be made available for effecting a change in the coefficient of friction along the surfaces where the materials contact one another.

Since the effectiveness of solids conveying in a plasticating extruder is dependent upon the above-described differential in coefficients of friction, it is an object of the present invention to increase that differential by providing a coating along surfaces of the extruder which contact the solids in the solids conveying zone, the coating material being selected for establishing an advantageous change in the coefficient of friction between the coated surfaces and the specific solids being conveyed so as to improve solids conveying.

Another object of the invention is to attain improved solids conveying in a plasticating extruder by providing a coating along specific outer surfaces of the screw conveyor of the extruder, the coating being selected for lowering the coefficient of friction between the specific coated surfaces and the solids being conveyed so as to increase the production effectiveness of the extruder.

Still another object of the invention is to locate the aforesaid coating so as to extend downstream essentially no further than the solids conveying zone of the extruder so as to gain the stated advantageous improvement in solids conveying without introducing possible deleterious effects downstream of the solids conveying zone.

Yet another object of the invention is to place the aforesaid coating along the core and along the flanks of the flight of the screw conveyor of the extruder, essentially within the solids conveying zone, but not along the crest of the flight, in order to preclude possible wiping of the coating material against the inner surface of the extruder barrel, with concomitant transfer of the coating material to, or polishing of, the barrel surface.

A further object of the invention is to provide method and apparatus by which a conventional plasticating extruder can be modified with minimal change and at relatively low cost to attain increased production effectiveness.

The above objects, as well as still further objects and advantages, are attained by the present invention which may be described briefly as the method of and an improvement for increasing the production effectiveness of a plasticating extruder through improved solids conveying, the solids being of a specified material and the plasticating extruder being of the type having a barrel with an inner surface, a screw conveyor with an outer surface, a solid materials feed means for feeding solids into the barrel to the screw conveyor, and a solids conveying zone in which the solids are advanced by the screw conveyor through the barrel, in a direction from an upstream end toward a downstream end, the method comprising the step of increasing the differential between the coefficient of friction exhibited between the solids and the inner surface of the barrel along the solids conveying zone and the coefficient of friction exhibited between the solids and the screw conveyor outer surface in the solids conveying zone by coating at least a portion of at least one of said inner and outer surfaces in the solids conveying zone with a selected coating, the coating being selected for exhibiting a different coefficient of friction between the selected coating and the solids of specified material than would exist between the same solids and corresponding uncoated surfaces, the different coefficient of friction effecting said increased differential between the coefficients of friction at said inner and outer surfaces, thereby increasing the production effectiveness of the extruder, and the improvement comprising the aforesaid selected coating located as set forth.

The invention will be more fully understood, while still further objects and advantages will become apparent, in the following detailed description of an embodiment of the invention illustrated in the accompanying drawing, wherein the single FIGURE is a schematic representation of a typical plasticating extruder employing the method and improvement of the present invention.

Referring now to the drawing, a plasticating extruder similar to the type now in common use is illustrated schematically at 10 and is seen to include a barrel 12, extending axially between an upstream end 14 and a downstream end 16, and a screw conveyor 18 in the barrel. The purpose of the illustrated arrangement is to melt, or plasticate, a solid material, or a molten material having a high viscosity at room temperature, and to deliver, or pump, the plasticated material to a further apparatus, such as the mold of a molding machine, a die or the like. It will be understood that the terms "solids" and "solid material," as employed herein, include highly viscous materials which behave similar to solids in the described apparatus as well as actual solid materials. A reservoir of solid material 20 is held in a hopper 22 which communicates with the inner chamber 24 of the barrel 12 adjacent the upstream end 14 and feeds the solid material 20 into a channel 26 defined by a helical flight 28 on the screw conveyor 18. Rotation of the screw conveyor 18 within the barrel 12 will advance the material 20 along the channel 26 in a downstream direction 30 until the material is delivered, in melted form, to a discharge point 32 at the downstream end 16 of the barrel.

Extruder 10 may be divided into several functional zones; namely, a solids conveying zone 34, a delay zone 38, a melting zone 40, and a melt conveying zone 42.

The hopper 22 serves as a reservoir for the solid material 20 and assures that solids are continuously supplied to the extruder. The solids enter the solids conveying zone 34 at the hopper 22 and are conveyed downstream by the screw conveyor 18 to the delay zone 38. The solids conveying zone 34 occupies a portion of the channel 26 where no melting of the solid material 20 takes place. The solids conveying zone 34 begins essentially at the point where solids are fed to the channel 26 by the hopper 22 and extends downstream to the delay zone 38. The function of solids conveying zone 34 is to compact the solids in the channel 26 into a solid bed 44.

The delay zone 38 starts at the point where the inner surface 46 of the barrel 12 reaches the melting point of the material 20, either as a result of heat conducted through a heated barrel, or because of frictional heat generated by the solid bed 44 rubbing against the barrel. The melt generated at the inner surface 46 of the barrel 12 forms a continuous film 50, provided that the solid bed 44 is sufficiently compacted. Compacting of the solid bed 44 depends upon the effectiveness of the solids conveying zone 34. Over the whole length of the delay zone 38, melt appears only in the film 50 between the solid bed 44 and the inner surface 46 of the barrel 12.

The melting zone 40 begins at the point where the delay zone 38 ends and where a melt pool 52 starts to form, cross-channel between the leading face 54 of the flight 28, which faces downstream, and the confronting trailing face 56 of the flight 28, which faces upstream. The melt pool 52 is juxtaposed with the leading face 54 of the flight 28 and gradually replaces the progressively melting solid bed 44 throughout the length of the melting zone 40. The melting zone 40 usually occupies the major portion of the length of the extruder 10.

The melt conveying zone 42 is the last functional zone of the extruder 10 and identifies the portion of the extruder where essentially no unmelted solids remain. In zone 42, melted material is pumped to the discharge point 32 at end 16 of the barrel.

As described above, an important aspect to be considered in attaining an optimum rate of production from an extruder, whether a single-screw extruder, such as extruder 10, or a multiple-screw extruder, while assuring that the extrudate is of high quality, is the effectiveness of the solids conveying zone in compacting the solids into a solid bed 44 and conveying the compacted solids downstream. In an article entitled "Resin Friction 'Hidden Force' In Extrusion Output," by Dr. Imrich Klein, published in the January, 1979, issue of *Plastics World*, it is demonstrated that the frictional properties of a synthetic resin material can affect the efficiency with which the solid materials will move through the solids conveying zone. The article points out that the maintenance of an adequate differential between the coefficients of friction at the screw conveyor outer surface and at the barrel inner surface in the solids conveying zone has been found to be a key factor in attaining effective solids conveying. Additionally, reported experiments conducted by David W. Riley and Imrich Klein illustrate that the frictional properties of plastics differ greatly from one type to another. More particularly, the coefficient of friction between a plastic in the solids conveying zone of an extruder and the surfaces contacted by the plastic, namely, the inner surface of the barrel and the outer surface of the screw conveyor, differs from one plastic to another. For example, plasticized PVC tends to have the highest values, low density polyethylene is next, followed by polystyrene, then polypropylene, and finally high density polyethylene which exhibits the lowest values.

We have conducted further experiments which show that the coefficient of friction is influenced by a coating applied to surfaces contacted by the solids in the solids conveying zone of an extruder and which demonstrate that a selected coating can provide either an increase or a decrease in the coefficient of friction, as compared to the coefficient of friction exhibited with corresponding uncoated surfaces, depending upon the specific solids being conveyed in the extruder. Thus, as illustrated in the drawing, a coating 60 is placed upon the outer surface 62 of the screw conveyor 18. Screw conveyor 18 includes a core 64 from which flight 28 extends radially outwardly to a crest 66. Flanks 68 of the flight 28 extend radially between the core 64 and crest 66. Coating 60 extends along the outer surface of the core 64 and along the outer surface of each flank 68.

The material for coating 60 is selected from among those materials which exhibit a lower coefficient of friction when contacted by a specified solid material 20 to be plasticated in the extruder 10, as compared to the coefficient of friction exhibited under similar conditions along a screw conveyor having corresponding uncoated surfaces. In addition, coating 60 must possess sufficient resistance to wear and abrasion, especially at the temperatures found in the solids conveying zone, as well as sufficient tenacity, so as to remain intact and in operation over a reasonable service life. An example of a material for such a coating is a fluoroplastic, such as polytetrafluoroethylene (PTFE). One such coating is available commercially from General Magnaplate Corporation under the designation NEDOX. A coating of NEDOX provides a surface of polytetrafluoroethylene (PTFE) which will be contacted by the solid material 20 in the solids conveying zone.

In experiments conducted with an uncoated screw conveyor, and then with a similar screw conveyor with a NEDOX coating along the solids conveying zone, a high density polyethylene (American Hoechst 9255F) was plasticated at a rate of 96 pounds per hour with the uncoated screw conveyor, while the screw conveyor with the coating delivered 108 pounds per hour. The increase of 12 pounds per hour, or 12.5%, represents a significant increase in production effectiveness resulting from improved solids conveying.

Preferably, the coating 60 extends from beneath the hopper 22 downstream essentially no further than the solids conveying zone 34. The axial extent of coating 60 preferably is limited to the illustrated zone, with coating 60 trailing off at a downstream location 70, since the purpose of the coating is to improve solids conveying by increasing the differential between the coefficients of friction at the barrel inner surface 46 and the screw conveyor outer surface 62. The presence of melt film 50 downstream of the solids conveying zone 34 terminates the differential between the coefficients of friction, as found in the solids conveying zone, so that the improvement of the present invention is confined to the effect of the coating 60 in the solids conveying zone 34. Furthermore, a coating, such as coating 60, on the screw conveyor 18 downstream beyond the solids conveying zone 34 would be in zones of elevated temperatures. Since such coatings tend to be heated insulators, rather than heat conductors, heat will not be transferred as readily from a coated screw conveyor, resulting in elevated screw conveyor temperatures and possible damage through over-heating. In addition, over-heating of the coating could lead to deterioration and separation, thereby opening a possible source of contamination of the processed material. For at least these reasons, it is preferable to confine coating 60 to an axial length extending downstream essentially no further than the downstream end of the solids conveying zone.

It is noted that it is preferred to confine coating 60 to the surface of core 64 and the surfaces of flanks 68 of the flight 28 of screw conveyor 18, leaving the crest 66 without a coating. The reason for this is that the clearance between the crest 66 and the inner surface 46 of barrel 12 is very small. In practice, the crest 66 can rub against the inner surface 46. Any coating placed on crest 66 would be subjected to possible wiping against inner surface 46 of barrel 12, with concomitant polishing of the inner surface 46 of the barrel, or a transfer of some of the coating material to the barrel inner surface 46. Either condition would alter the frictional properties of the barrel inner surface 46 and could result in a reduced differential in the coefficients of friction at the barrel inner surface 46 and at the screw conveyor outer surface 62. Hence, the crest 66 preferably is not coated.

Because the coefficient of friction between the solid material 20 and the coating 60 is dependent upon the particular combination of a specified solid material 20 and a selected coating 60, for any selected coating 60, the coefficient of friction will vary with different solid materials 20. Therefore, it becomes necessary to select a coating 60 which will alter the magnitude of the coefficient of friction, when used with a specified solid material 20, in the direction of increasing the differential between the coefficients of friction at the barrel inner surface 46 and at the screw conveyor outer surface 62. In the example cited above, a NEDOX coating applied to the outer surface of a screw conveyor increased the production effectiveness of a plasticating extruder in which a high density polyethylene was being plasticated. However, in other experiments, utilizing a low density polyethylene (Dow 61500.45) in the same extruder under the same conditions, an uncoated screw conveyor yielded a production rate of 152 pounds per hour while a similar screw conveyor, but having a coating of NEDOX placed in the solids conveying zone, yielded a production rate of 112 pounds per hour. The decrease of 40 pounds per hour, or about 26.3%, indicates that the NEDOX coating effected an increase in the coefficient of friction between that particular solid material and the coated surface of the screw conveyor, thereby reducing the differential between the coefficients of friction at the barrel inner surface and at the screw conveyor outer surface, with a consequent reduction in the efficiency of solids conveying in the solids conveying zone. The particular combination of a NEDOX coating and a low density polyethylene (such as DOW 61500.45) can be used to advantage by placing the coating along the inner surface of the barrel, in the solids conveying zone, while leaving the screw conveyor uncoated, so that an increase is effected in the magnitude of the coefficient of friction at the barrel inner surface with a resultant increase in the differential between the coefficients of friction at the barrel inner surface and at the screw conveyor outer surface.

We are aware of the fact that NEDOX coatings have been applied to extrusion screws and that knowledge of such a use for NEDOX coatings was published more than one year prior to the date of the instant application; however, to the best of our knowledge, the NEDOX coatings were applied along the entire length of such extrusion screws for the purpose of imparting corrosion resistance to the outer surface of the screws. We believe that we are the first to recognize that coatings, such as NEDOX coatings, can be utilized on specified surfaces within a plasticating extruder to alter coefficients of friction in the solids conveying zone in such a way as to increase the differential between the coefficient of friction at the barrel inner surface and the coefficient of friction at the screw conveyor outer surface and thereby improve solids conveying and increase the production effectiveness of the extruder.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. The method of increasing the production effectiveness of a plasticating extruder through improved solids conveying, the solids being of a specified material and the plasticating extruder being of the type having a barrel with an inner surface, a screw conveyor including a core and a flight with flanks extending generally radially between the core and a radially outermost crest of the flight, the screw conveyor having an outer surface extending over the core and over the flight, a solid materials feed means for feeding solids into the barrel to the screw conveyor, and a solids conveying zone in which the solids are advanced by the screw conveyor through the barrel, in a direction from an upstream end toward a downstream end, said method comprising the step of increasing the differential between the coefficient of friction exhibited between the solids and the inner surface of the barrel along the solids conveying zone and the coefficient of friction exhibited between the solids and the screw conveyor outer surfaces in the solids conveying zone by providing a selected coating on the outer surface of the screw conveyor in the solids conveying zone, along at least the outer surface of the core of the screw conveyor and the outer surface of the flanks of the flight of the screw conveyor, the coating being selected for exhibiting a lower coefficient of friction between the selected coating and the solids of specified material than would exist between the same solids and corresponding uncoated outer surfaces of the core and the flanks, thereby increasing the production effectiveness of the extruder.

2. The invention of claim 1 wherein the coating is provided along only that portion of the screw conveyor lying essentially no further downstream than the solids conveying zone.

3. The invention of claim 1 or 2 wherein the coating is provided only along the outer surface of the core and along the outer surface of the flanks of the flight of the screw conveyor, with essentially no coating being provided along the crest of the flight.

4. The invention of claim 3 wherein the coating provides an outer surface of a fluoroplastic such as polytetrafluoroethylene.

5. The invention of claim 1 or 2 wherein the coating provides an outer surface of a fluoroplastic such as polytetrafluoroethylene.

6. The method of increasing the production effectiveness of a plasticating extruder through improved solids conveying, the solids being of a specified material and the plasticating extruder being of the type having a barrel with an inner surface, a screw conveyor having an outer surface, a solid materials feed means for feeding solids into the barrel to the screw conveyor, and a solids conveying zone in which the solids are advanced by the screw conveyor through the barrel, in a direction from an upstream end toward a downstream end, said method comprising the step of increasing the differential between the coefficient of friction exhibited between the solids and the inner surface of the barrel along the solids conveying zone and the coefficient of friction exhibited between the solids and the screw conveyor outer surface in the solids conveying zone by coating at least a portion of at least one of said inner and outer surfaces in the solids conveying zone with a selected coating, the coating being selected for exhibiting a different coefficient of friction between the selected coating and the solids of specified material than would exist between the same solids and corresponding uncoated surfaces, the different coefficient of friction effecting said increased differential between the coefficients of friction at said inner and outer surfaces, thereby increasing the production effectiveness of the extruder.

7. In a plasticating extruder, an improvement by which the production effectiveness of the plasticating extruder is increased through improved solids conveying, the solids being of a specified material and the plasticating extruder being of the type having a barrel with an inner surface, a screw conveyor including a core and a flight with flanks extending generally radially between the core and a radially outermost crest of the flight, the screw conveyor having an outer surface extending over the core and over the flight, a solid materials feed means for feeding solids into the barrel to the screw conveyor, and a solids conveying zone in which the solids are advanced by the screw conveyor through the barrel, in a direction from an upstream end toward a downstream end, the improvement comprising a selected coating on the outer surface of the screw conveyor at least in the solids conveying zone, along at least the outer surface of the core of the screw conveyor and the outer surface of the flanks of the flight of the screw conveyor, the coating being selected for exhibiting a lower coefficient of friction between the selected coating and the solids of specified material than would exist between the same solids and corresponding uncoated outer surfaces of the core and the flanks so as to increase the differential between the coefficient of friction exhibited between the solids and the inner surface of the barrel along the solids conveying zone and the coefficient of friction exhibited between the solids and the coated screw conveyor outer surfaces, thereby increasing the production effectiveness of the extruder.

8. The invention of claim 7 wherein the coating extends along only that portion of the screw conveyor lying essentially no further downstream than the solids conveying zone.

9. The invention of claim 7 or 8 wherein the coating extends only along the outer surface of the core and along the outer surface of the flanks of the flight of the screw conveyor, with essentially no portion of the coating extending onto the crest of the flight.

10. The invention of claim 9 wherein the coating includes an outer surface of a fluoroplastic such as polytetrafluoroethylene.

11. The invention of claim 7 or 8 wherein the coating includes an outer surface of a fluoroplastic such as polytetrafluoroethylene.

12. In a plasticating extruder, an improvement by which the production effectiveness of the plasticating extruder is increased through improved solids conveying, the solids being of a specified material and the plasticating extruder being of the type having a barrel with an inner surface, a screw conveyor having an outer surface, a solid materials feed means for feeding solids into the barrel to the screw conveyor, and a solids conveying zone in which the solids are advanced by the screw conveyor through the barrel, in a direction from an upstream end toward a downstream end, the improvement comprising a coating on at least a portion of at least one of said inner and outer surfaces at least in the solids conveying zone, the coating being selected for exhibiting a different coefficient of friction between the selected coating and the solids of specified material than would exist between the same solids and corresponding uncoated surfaces, so as to increase the differential between the coefficient of friction exhibited between the solids and the inner surface of the barrel along the solids conveying zone and the coefficient of friction exhibited between the solids and the screw conveyor outer surface in the solids conveying zone, thereby increasing the production effectiveness of the extruder.

* * * * *